Patented Sept. 18, 1945

2,385,275

UNITED STATES PATENT OFFICE 2,385,275

ACCELERATORS OF VULCANIZATION

Albert F. Hardman, Akron, Ohio, assignor to Wingfoot Corporation, Akron, Ohio, a corporation of Delaware No Drawing. Application February 26, 1943, Serial No. 477,263

1 Claim. (Cl. 260—455)

This invention relates to the vulcanization of rubber and more particularly to the provision and use of a novel and specific accelerator.

According to the present invention, β-naphthol, benzaldehyde and dimethylamine are reacted to form 1-(alpha-dimethyl-aminobenzyl) naphthol-2. This compound is then further reacted with a mol of carbon bisulfide to produce an addition product in which the two materials combine in equimolecular proportions.

The preparation of the accelerator compound is illustrated by the following examples:

Example 1

A mixture of 72 grams of β-naphthol, 90 grams of a 25% aqueous solution of dimethylamine, 53 grams of freshly distilled benzaldehyde and 100 cc. of ethyl alcohol was allowed to stand at room temperature of 2 days. Crystals began to separate after about 2 or 3 hours. The crystals were filtered off and washed with alcohol. The yield was 107 grams. The product melted at 156–158° C. and corresponds to the structural formula

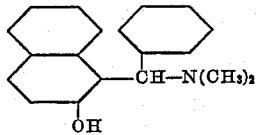

Example 2

Twenty-eight grams of 1-(alpha-dimethylaminobenzyl) naphthol-2 (the product of Example 1), 10 grams of carbon bisulfide and 100 cc. of ethyl alcohol were mixed and the mixture was refluxed for 7 or 8 hours. The white crystals originally present did not dissolve immediately in the boiling solvent but slowly changed in appearance. The mixture was allowed to stand overnight and the crystals were then filtered off and washed with alcohol. After drying, the product weighed 35 grams and melted with decomposition at 167° C. The product is believed to conform to the following structural formula:

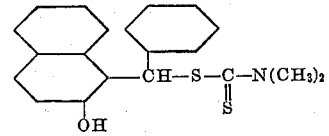

Analysis showed a sulfur content of 18.03% and a nitrogen content of 3.60%. The theoretical sulfur and nitrogen contents based on the structural formula shown are 18.1% and 3.96%, respectively.

The product of Example 2 was compounded into rubber as an accelerator according to following Formula A and samples were cured and tested in the usual manner.

Formula A

| | Parts by weight |
|---|---|
| Smoked sheet rubber | 100.0 |
| Zinc oxide | 5.0 |
| Sulfur | 3.0 |
| Accelerator | 0.5 |

An excellent cure was obtained in 30 minutes at 240° F. with no tendency to scorch. The ultimate tensile strength was 190 kg./sq. cm., the ultimate elongation was 755% and the modulus at 500% elongation was 32 kg./sq. cm.

The method of treating rubber and the rubber product obtained by the practice of this invention are claimed in co-pending application Serial No. 576,371, filed February 5, 1945.

I claim:

As a new compound, the addition product of equimolecular proportions of carbon bisulfide and 1-(α-dimethylaminobenzyl) naphthol-2.

ALBERT F. HARDMAN.